June 2, 1959 R. I. ROTH 2,889,539

DATA STORAGE DEVICE

Filed Dec. 24, 1953 5 Sheets-Sheet 1

INVENTOR.
ROBERT I. ROTH

BY Burton P. Beatty

ATTORNEY

June 2, 1959 R. I. ROTH 2,889,539

DATA STORAGE DEVICE

Filed Dec. 24, 1953

5 Sheets-Sheet 2

INVENTOR.
ROBERT I. ROTH

BY Burton P. Beatty

ATTORNEY

INVENTOR.
ROBERT I. ROTH
BY
Burton P. Beatty
ATTORNEY

INVENTOR.
ROBERT I. ROTH
BY
Burton P. Beatty
ATTORNEY

June 2, 1959 R. I. ROTH 2,889,539

DATA STORAGE DEVICE

Filed Dec. 24, 1953 5 Sheets-Sheet 5

INVENTOR.
ROBERT I. ROTH

BY Burton P. Beatty
ATTORNEY 2,889,539

DATA STORAGE DEVICE

Robert I. Roth, Mount Pleasant, N.Y., assignor to International Business Machines Corporation, New York, N.Y., a corporation of New York Application December 24, 1953, Serial No. 400,327

7 Claims. (Cl. 340—173)

This invention relates generally to storage devices and more particularly to the type wherein a circuit connection is established through an electrically responsive fluid.

The principal object of the present invention is to provide a novel storage device in which it is possible to store a plurality of columns of information.

An object of the invention is to establish a conductive path across a gap between spaced terminal members in an electrically responsive fluid by applying an actuating electrical impulse across the terminal members, whereby data can be stored for subsequent readout.

Another object of the invention is to provide a novel resetting means for the storage device wherein the electrically responsive fluid is agitated each time the information in storage is erased.

Other objects of the invention will be pointed out in the following description and claims and illustrated in the accompanying drawings, which disclose, by way of examples, the principle of the invention and the best mode, which has been contemplated, of applying that principle.

Figure 7A:
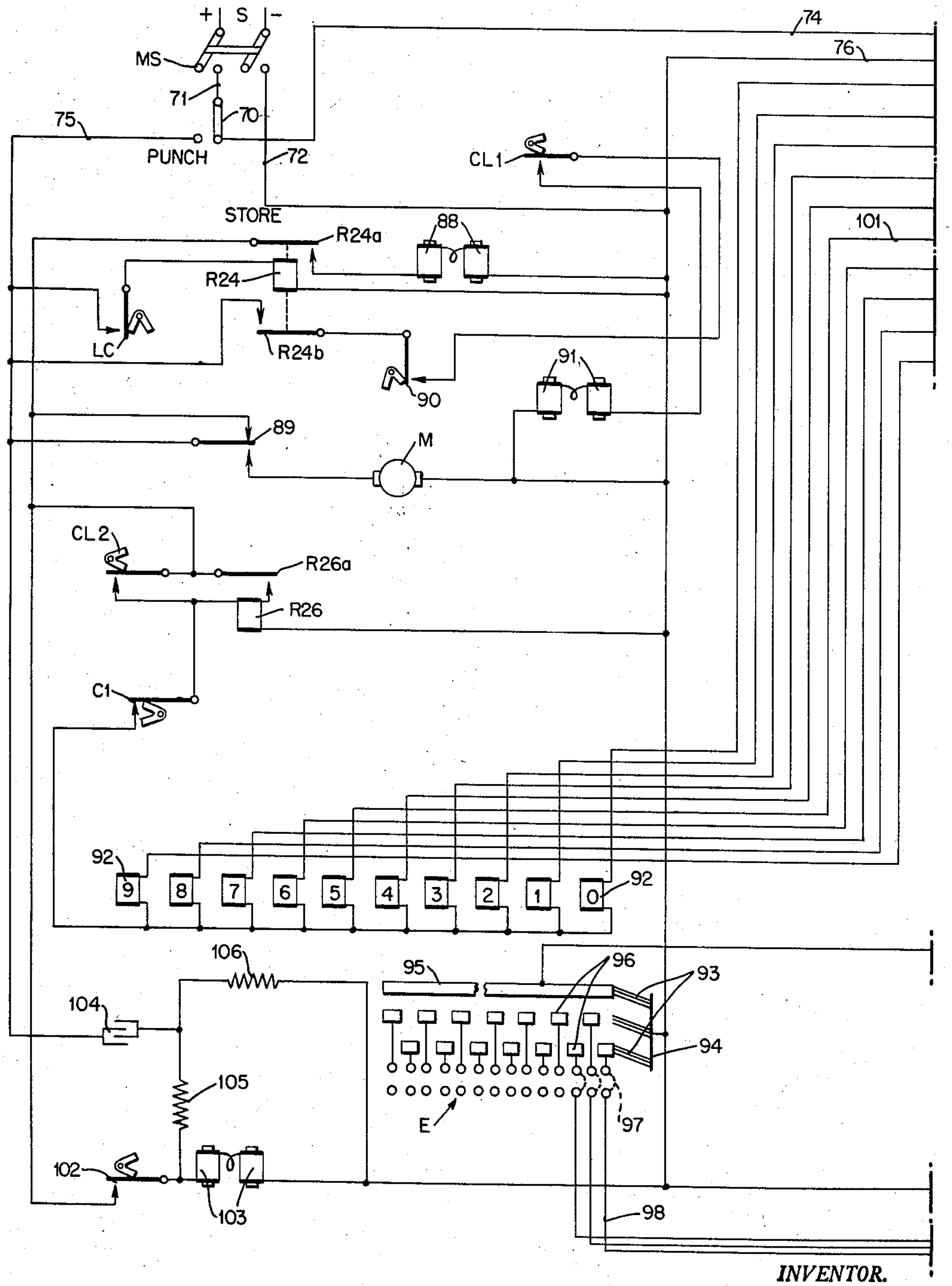
Figure 7B:
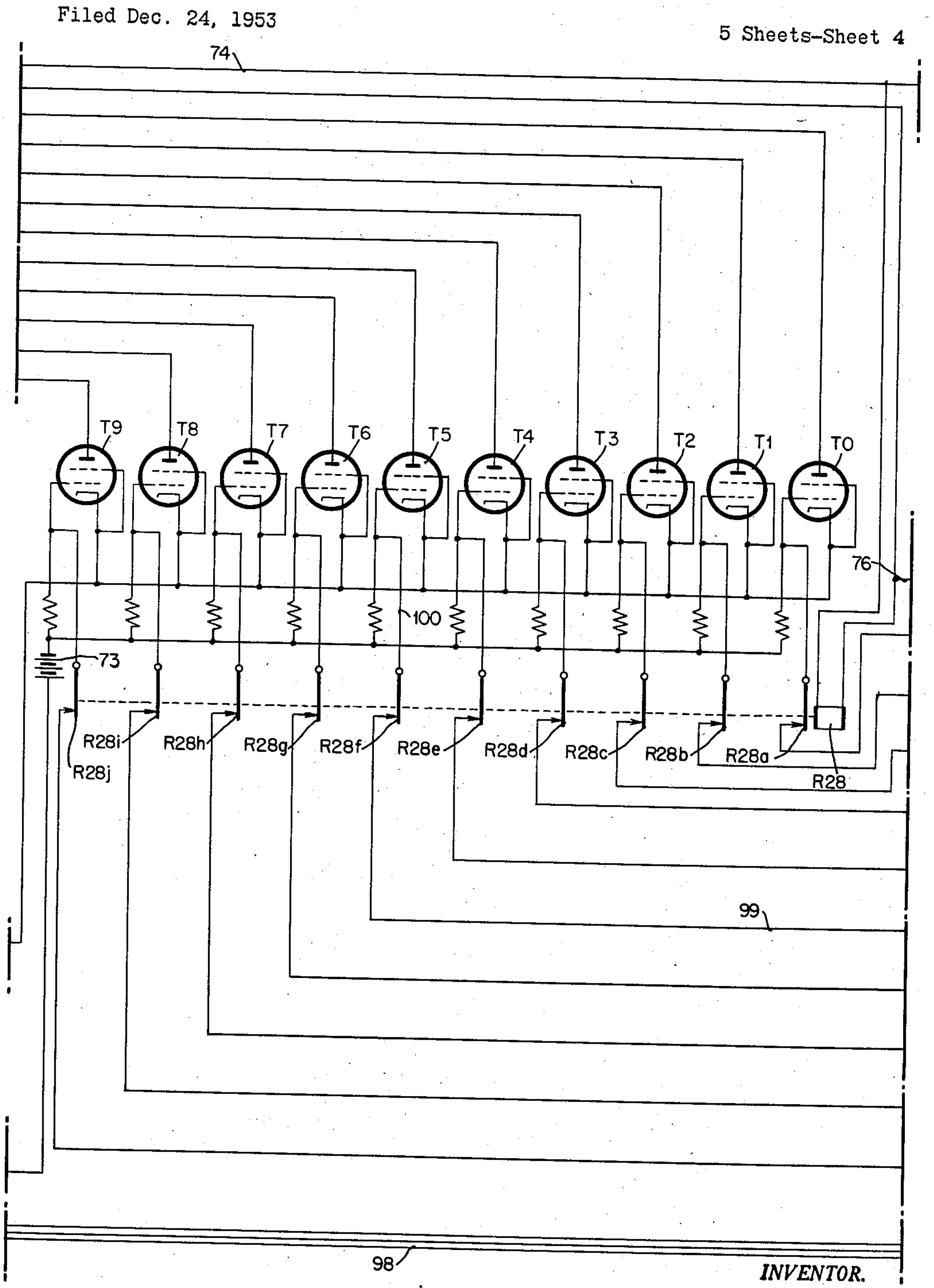
Figure 7C:
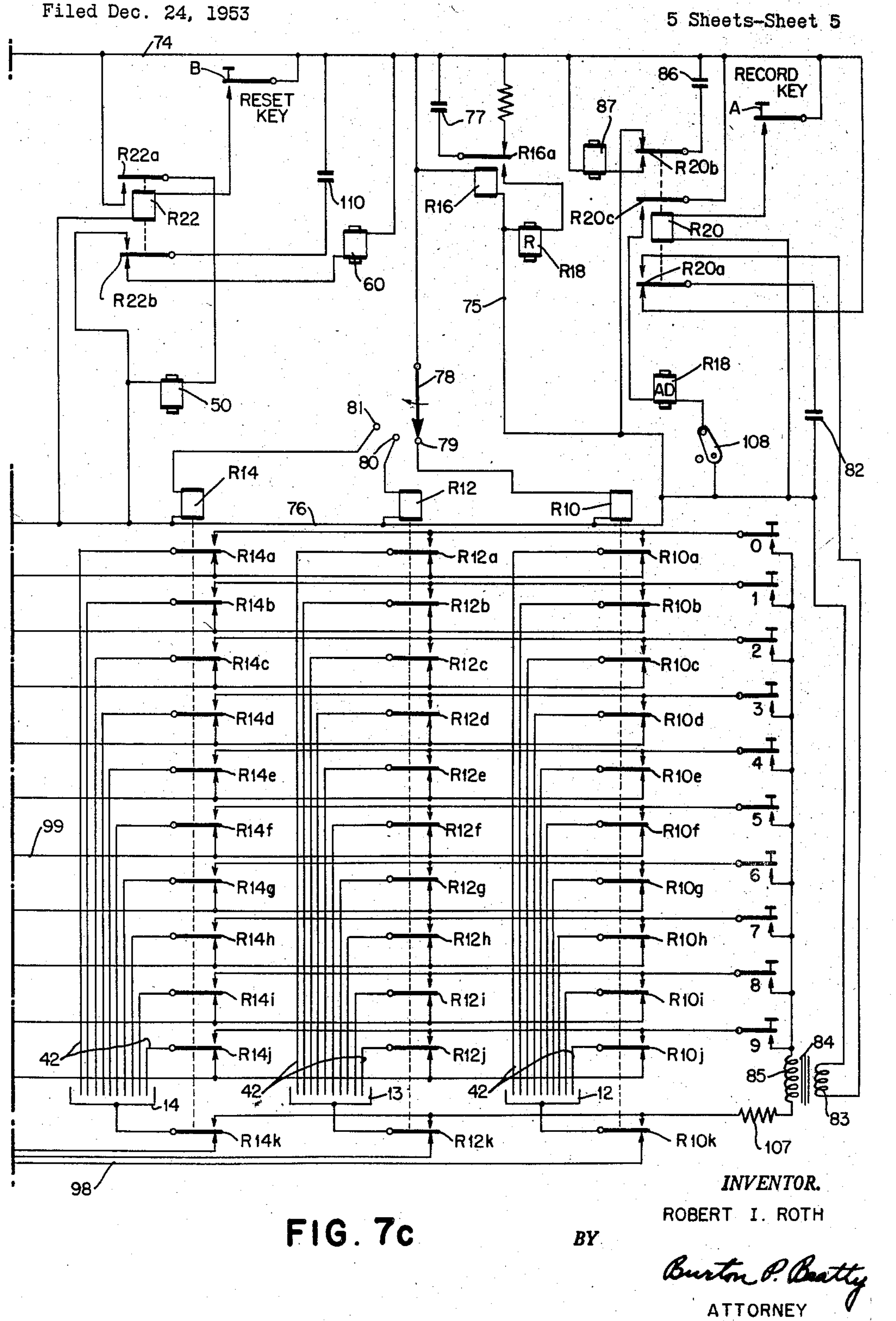

Figs. 7*a*, 7*b* and 7*c* taken together comprise an electrical wiring diagram of the preferred form of the invention.

In the storage device of the present invention a container comprised of electrically conductive material is located in each data receiving position which represents the column of a record card. A mixture of non-conductive fluid and finely divided metallic particles is provided in each container and a group of ten electrodes extends into each mixture in such a manner that a gap exists between each electrode and its related container. Means are provided to enter data in each receiving position successively which includes means to draw particles, one against the other, to form and hold an electrically conductive path which bridges the gap between the container and a selected electrode. The data stored in each position is then indicated by a readout mechanism under control of the storage device. The stored data is erased by a mechanism which agitates each mixture to disburse the particles forming the conductive path throughout the fluid.

Figures 1, 5, 6:
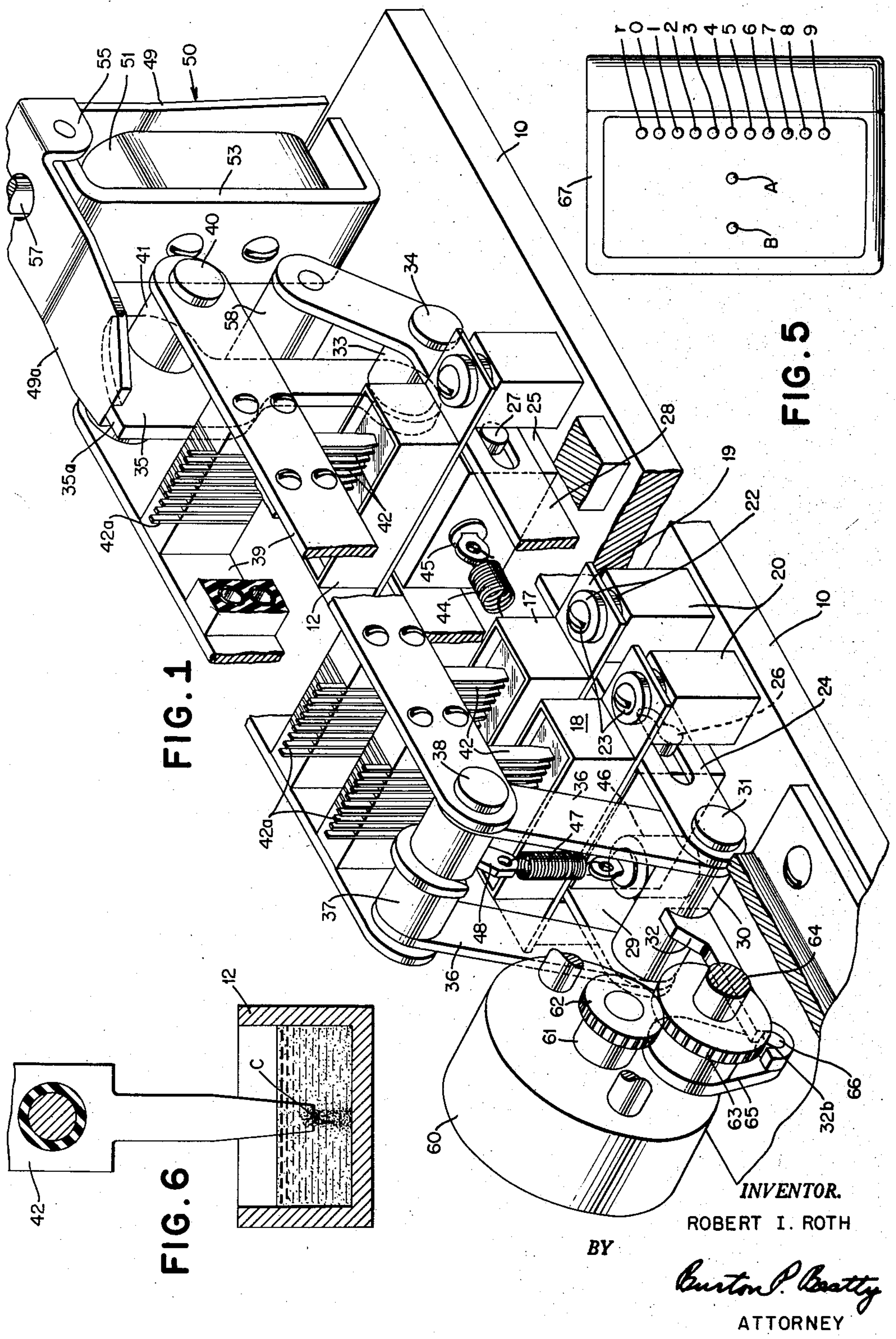
Fig. 1 is a perspective view of the resetting mechanism and storage device of the present invention showing the parts in the normal position before actuation.
Fig. 5 is a diagrammatic view of the keyboard showing the placement of the control keys.
Fig. 6 is a detail view showing a conductive path of metallic particles extending between the spaced terminal members.
Figures 2, 3, 4:
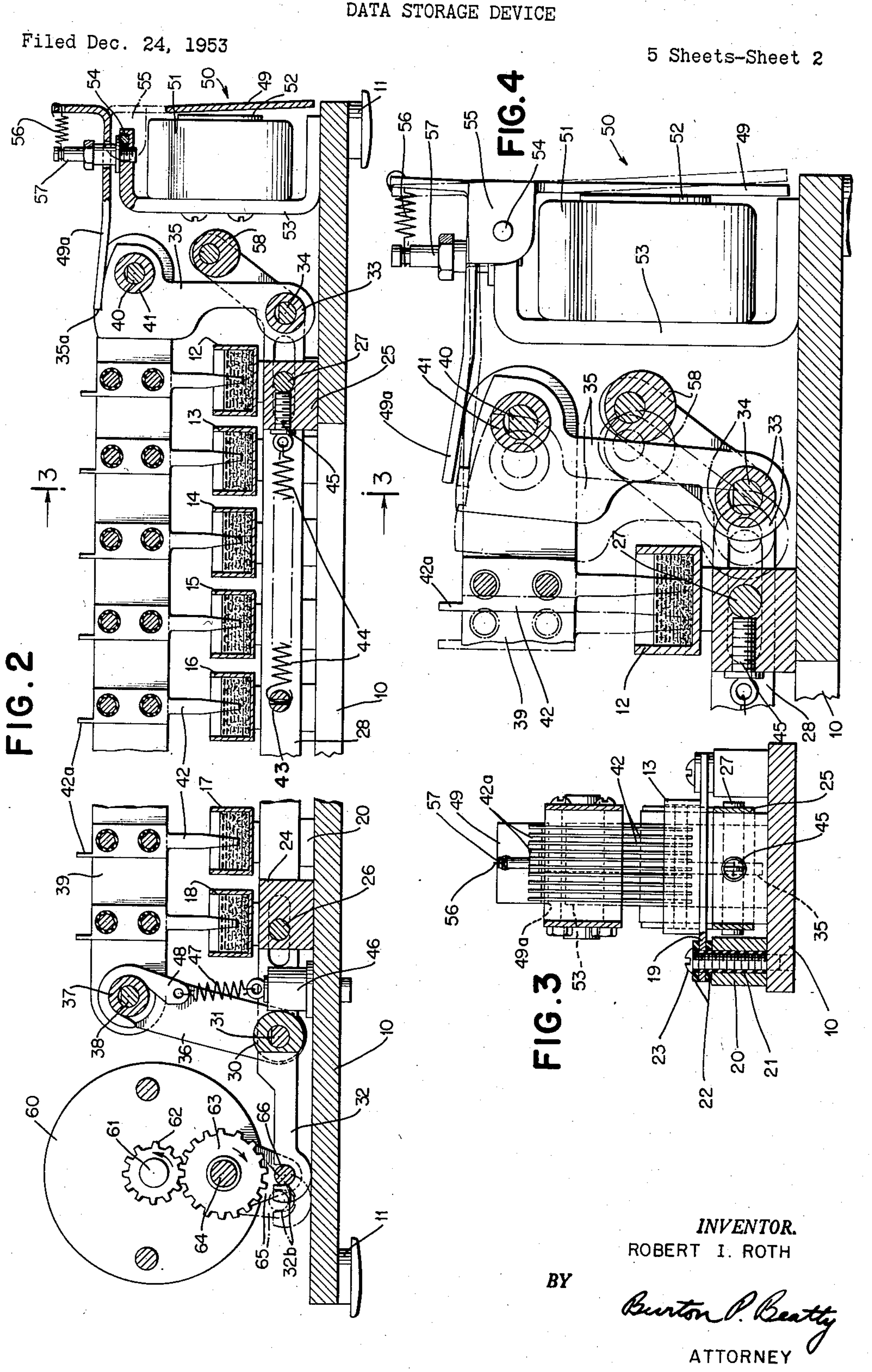
Fig. 2 is a side elevational view in section of the resetting mechanism showing the parts in the normal position.
Fig. 3 is a sectional view taken along lines 3—3 of Fig. 2.
Fig. 4 is an enlarged detail view of the mechanism which controls the actuation of the electrodes.

Referring to Figs. 1 and 2, it is seen that the mechanism of this invention has a base plate 10 mounted on pairs of rubber feet 11. A plurality of containers designated 12, 13, 14, 15, 16, 17 and 18 in Fig. 2 are mounted on individual support plates 19 (Fig. 3) which are in turn supported on blocks 20. Each of these containers is comprised of electrically conductive material. An insulating tube 21 extends through a clearance hole in each block 20 and through a pair of insulating washers 22 upon which each plate 19 rests. A screw 23 is passed through each washer and tube and the corresponding plate 19 to secure the entire container unit to the base plate 10. In this manner all of the containers are rigidly supported by and insulated from the base plate 10. Each container is provided with a mixture of tricresyl phosphate and finely divided iron powder for a purpose which is explained later. Other finely divided metallic particles and insulating oils can be used.

Only seven containers are shown in Fig. 2. It is to be understood that as many similar containers can be added as required to provide a separate container for each card column in which data is to be stored.

Fastened to the base plate 10 are blocks 24 and 25 (Fig. 2), each of which carries a pair of pins 26 and 27, respectively. These pins extend a short distance from the side surfaces of blocks 24 and 25 (Fig. 1). Slides 28 and 29 are mounted for reciprocation on pins 26 and 27 through elongated slots. A cylindrical member 30 is pivotally connected to the left hand ends of slides 28 and 29, as viewed in Fig. 2, by means of pivot pins 31. Secured to the cylindrical member 30 is a drag link 32 whose function will be explained hereinafter. A cylindrical member 33 is pivotally connected to slides 28 and 29 near their right hand ends by pivot pins 34. Integrally connected with the cylindrical member 33 is a latch 35, having a ridge portion **35*a*. A pair of links 36 is pivotally mounted on pins 31 and are connected at their upper ends by a cylindrical member 37. A pair of pins 38 pivot together the ends of member 37 and the left hand ends of a pair of horizontal links 39. The right hand ends of links 39 are pivotally connected by pivot pins 40 to a cylindrical member 41 which is integral with the upper portion of latch 35**.

The horizontal links 39 are positioned above the row of containers designated 12 to 18 inclusive in Fig. 2 and support between them a series of groups of electrodes 42. Each group is composed of ten electrodes 42 (Fig. 3) which are aligned with a particular container. Each electrode can represent an index position on a record card. The electrodes 42 are mounted in the usual contact pile-up manner between links 39 to insulate them from the links. Each electrode 42 is provided with a lug portion **42*a* to which a lead wire can be connected. In Fig. 2 the electrodes 42** are shown extending downwardly into the iron-oil mixture in the containers. A gap to be utilized as a conductive path exists between the lower end of each electrode and the inner surface of its related container.

Extending between the slides 28 and 29 is a rod 43 to which is attached one end of a coil spring 44. The other end of spring 44 is anchored on a screw 45 which is threaded into the block 25. This spring urges slides 28 and 29 to the right, as viewed in Fig. 2, and cylindrical member 30 against a stop 46 which projects upwardly from the base plate 10. A coil spring 47 extends between the stop 46 and a spring hook 48 which is fitted over the cylindrical member 37. This spring urges the links 36 in a clockwise direction about pivot pins 31. The horizontal links 39 are in turn urged to the right to hold the ridge 35*a* of latch 35 firmly against the end of an extension 49*a* of an armature 49.

The armature 49 is actuated by a magnet generally designated 50 in Figs. 1, 2 and 4. The coil 51 of this magnet is supported by a core 52 which in turn is fastened to a yoke 53 carried by base plate 10. The armature 49 is pivotally connected at 54 to yoke 53 through a pair of outwardly projecting ears 55. A coil spring 56 extends between the upper portion of armature 49 and a stud 57 projecting upwardly from yoke 53. This stud extends through an opening in armature extension 49*a* which is large enough to permit movement of the armature 49 about its pivot point 54. The spring 56 urges the armature in a counterclockwise direction, as viewed in Fig. 4, to normally hold the end of extension 49*a* in a position to be engaged by the ridge 35*a* of latch 35.

When the magnet 50 is energized, the armature 49 is drawn toward the core 52 and moves clockwise about its pivot point 54 to the position shown by the solid line in Fig. 4. The armature extension 49*a* is raised away from the ridge 35*a* of latch 35, thereby permitting spring 47 to move the links 36 clockwise about pins 31, as viewed in Fig. 2, and horizontal links 39 toward the right. The movement of the links 39 causes latch 35 to rotate in a clockwise direction until it engages a stop bar 58. This bar is secured between the upturned ends of slides 28 and 29. The electrodes 42 in each group are thus moved downwardly and to the right causing their lower ends to move through the iron oil mixture in their respective containers. This new position of the electrodes 42 is shown in Fig. 4.

Upon completion of this motion of the electrodes 42, the drag link 32 is operated by mechanism described hereinafter, to cause slides 28 and 29 to move to the left as viewed in Fig. 2. In moving to the left, the electrodes 42 are dragged through the iron particles which have deposited on the bottom of the container. This causes the particles to again be suspended in the oil. The electrodes are moved until they reach the position shown by the dotted line on the left in Fig. 4. Since the latch 35 is now resting against the stop bar 58, the latch is moved to the left sufficiently to allow the armature extension 49*a* to drop off the latch ridge 35*a* under pressure of spring 56 as shown by the dotted line in Fig. 4. The magnet 50 is picked up only momentarily and is conditioned to be reset when the slides 28 and 29 begin their movement to the left. When the drag link 32 has reached the limit of its stroke as shown by the dotted line position in Fig. 2, it is released to permit spring 44 to return the slides 28 and 29 to their initial position. The latch 35 moves with the slides. The ridge 35*a* is engaged by armature extension 49*a* and remains against the armature while the other parts move to the position of Fig. 2. The links 39 are moved upwardly and to the left by this action of latch 35 until the electrodes 42 are returned to their initial position.

The drag link 32 is actuated by means of a rotary solenoid 60 having an output shaft 61. Fastened to shaft 61 is a gear 62 which meshes with a gear 63 freely mounted on a stud 64. An arm 65 is formed integrally with gear 63 and carries at its lower end a pin 66. This pin is adapted to rest in a notch 32*b* in drag link 32. When the solenoid 60 is energized, the shaft 61 is moved in a counterclockwise direction and carries gear 62 with it. Gear 62 moves gear 63 clockwise which carries the pin 66 to the left (Fig. 2). Pin 66 moves the drag link 32 to the left against the action of spring 44 each time that solenoid 60 is energized.

It is thus seen that any conductive path comprised of iron particles extending between an electrode 42 and its related container can be broken by actuation of the resetting mechanism to disburse the particles throughout the tricresyl phosphate. In addition. Since the iron particles are heavier than the oil, there is a tendency on the part of the particles to settle to the bottom of the container. Actuation of the resetting mechanism causes the settled particles to be redistributed throughout the tricresyl phosphate to insure satisfactory operation of the storage device.

The storing of information is controlled from a key column section having a casing 67 shown in Fig. 5. Mounted in the casing is a conventional key column unit. This unit has eleven keys one of which is designated *r* and is merely a release key. The other ten keys are digit keys to select digits 0 to 9. Upon depression of a digit key, it is latched down by mechanism which is shown and described in United States Patent No. 2,543,-899, issued March 6, 1951, to A. H. Dickinson. The latched key may be released by depressing any other digit key in the column or by depressing the release key *r*. The key column section is provided with a solenoid 87 (Fig. 7*c*) which, when energized, actuates mechanism described in the aforementioned patent to release any latched digit key. This operation may be called the clearing operation.

There are two additional keys mounted in the casing 67 designated A and B, the functions of which will be explained in the following circuit description.

*Circuit diagram and operation*

Referring now to Figs. 7*a*, 7*b*, and 7*c* the storage device of this invention is shown to control a key punch mechanism similar to that disclosed in United States Patent No. 1,962,750, issued on June 12, 1934, to H. L. Read. It is to be understood that the storage device is not limited to use with a key punch but can be used in conjunction with other well known accounting machines where it is desired to store information for subsequent use in any accounting procedure. A source of current supply is shown at S in Fig. 7*a* and power from the source is made available for machine operations by the closing of a master switch MS. A double throw switch 70 when moved to the store position conditions the circuits to permit entry of information in the storage device and when moved to the punch position conditions the circuits to allow the information in storage to be punched into a record card.

In Fig. 7*c* only three iron-oil containers 12, 13 and 14 are shown to illustrate the operation of the storage device. A relay is provided in each order, these relays being designated R10, R12 and R14 and when energized connect the electrodes 42 associated with the container in their respective order to the contacts controlled by the keyboard keys 0–9 through their contacts *a* to *j*.

The voltages supplied by the source S are shown in Fig. 7*a* where lines 71 and 72 are at 110 and 0 volts, respectively. Also, a battery 73 (Fig. 7*b*) provides 22½ volts to the control grid of each of a series of electronic tubes designated T0 to T9. These voltage values are given only by way of example. It is to be understood that any suitable voltage values may be employed. The tubes T0–T9 are of the thyratron type, each having a screen grid and a control grid.

With the switch 70 (Fig. 7*a*) moved to the store position, a relay R28 (Fig. 7*b*) is energized to open its contacts R28*a* through R28*j* which are normally closed, and relay R16 (Fig. 7*c*) is energized through a circuit as follows: From line 71 through switch 70, wire 74, coil of relay R16, wires 75 and 76 to line 72. The relay contacts R16*a* are transferred to complete a circuit from line 71 through condenser 77 and the reset coil R of a stepping relay R18 to line 72. The reset coil is energized momentarily while condenser 77 charges. This energization causes the contact wiping arm 78 of relay R18 to return to its initial position on the first contact segment 79. A circuit is then completed through arm 78 and segment 79 to the coil of relay R10 which upon energization transfers its contacts R10*a* to R10*j*, inclusive. The electrodes 42 associated with container 12 are thus connected to the contacts controlled by the keyboard keys 0–9 and the storage device is ready to receive information.

The desired key 0–9 (Fig. 7*c*) is now depressed and it is held down by the latching mechanism shown in the previously mentioned United States Patent 2,543,899. A record key A is then depressed and upon closure of its contacts a circuit is established from line 71 and wire 74 through the coil of a relay R20 to line 72. A condenser 82 is connected between lines 74 and 76 through the normally closed contact of R20*a* and is therefore charged. The energization of relay R20 causes its R20*a* contacts to transfer to cause the condenser 82 to discharge through the primary coil 83 of a transformer 84. A high voltage pulse is thus induced in the transformer secondary coil 85. This pulse is applied across an electrode 42 and the container 12 through the related key contacts which have been closed by depression of one of the keys 0–9. The iron particles in the mixture distributed in container 12 are thereby aligned and drawn into contact, one against the other, to provide a conductive path between the electrode 42 and the container. In the present instance the lower end of each electrode is spaced approximately .025 inch from the upper surface of its related container. In order to insure reliable operation by establishing and holding a conductive path which bridges the gap between the terminals, a pulse of 300 volts or more must be applied across an electrode and its container. In this regard it must be noted that each electrode is required to be spaced a greater distance from its adjacent electrode than the lower end of the electrode is spaced from the container. The conductive path C thus formed is shown in Fig. 6.

For example, if the 5 key were depressed the high voltage pulse would establish the following path: From one side of coil 85, through the closed contacts of the 5 key, relay contacts R10*f* (transferred) the related electrode 42, conductive path C, container 12, relay contacts R10*k* (transferred) resistor 107 to the other side of coil 85. This conductive path continues to exist after the duration of the pulse and until the mixture is agitated by the mechanism described hereinbefore.

A condenser 86 is connected between lines 71 and 76 through the normally closed contact R20*b* and is therefore charged. The relay contacts R20*b* are also transferred when relay R20 is energized to cause the condenser 86 to discharge through solenoid 87. The energization of this solenoid actuates mechanism to release the depressed key and open the related key contacts. The mechanism controlled by solenoid 87 is shown in United States Patent 2,543,899. It is understood that the pulse from condenser 82 to the electrode 42 occurs before the key contacts are opened by the pulse from condenser 86.

The relay R20, when energized, closes its R20*c* contacts to complete a circuit through the advance coil AD of stepping relay R18. This relay R18 is of the type which is advanced upon deenergization of the advance coil. Accordingly, when the record key A is released, the relay R20 is dropped out and contacts R20*c* open. The circuit through coil AD of relay R18 is broken to deenergize this coil. The wiping arm 78 is advanced to the second contact segment 80, thus causing relay R10 to drop out and relay R12 to pick up. The relay contacts R20*a* and R20*b* transfer back to their initial positions to allow condensers 82 and 86 to again become charged.

It is thus seen that information can be stored column by column by operation of the keys 0–9 and the record key A. When the storage operations are completed, the switch 70 is moved to the punch position. This permits the last column control relay which was energized, to drop out along with relay R16. Relay R28 also drops out to close its associated contacts *a* through *j*.

It is also possible to store information represented by a plurality of index positions by opening the normally closed hand switch 108. When the record key A is depressed to establish a conductive path in one digit position, the advance coil AD of the stepping relay R18 cannot be energized. The switch 108 can then be closed and upon depression of the key A a second time, another conductive path is established in a second index position. The coil AD of relay R18 is energized to move arm 78 to the next column position.

When it is desired to erase information in storage, the reset key B is depressed to pick up a relay R22. The relay contacts R22*a* close to complete a circuit through the coil of the latch magnet 50 and contacts R22*b* transfer to connect a condenser 110 between lines 71 and 72. When the key B is released, the relay R22 is dropped out and its *a* and *b* contacts return to their initial positions. The condenser 110 then discharges through the coil of the solenoid 60 and magnet 50 is deenergized. The momentary energization of this solenoid 60 causes the iron oil mixture to be agitated by the resetting mechanism as set forth in the mechanical description.

The punch mechanism shown in Figure 7*a* is the well known duplicating key punch disclosed in the aforementioned United States Patent 1,962,750. For purposes of this description only those devices are included which are necessary to a clear understanding of the present invention. For a detailed description of the mechanisms which actuate the devices described herein, reference should be made to that patent. In this punch, the card carrier is positioned in the last column position at the start of machine operation and the contacts LC are closed to energize a relay R24 through a circuit as follows: From line 71 through switch 70, wire 75, contacts LC, relay R24 to line 72. The energization of relay R24 closes its "*a*" contacts to complete a circuit to a stacker magnet 88 as follows: From line 71, through switch 70, wire 75, latch contacts 89 (normal), relay contacts R24*a*, coils of stacker magnet 88 to line 72.

The energization of magnet 88 causes the card to be ejected and flipped over into the machine stacker causing closure of the auto-start contacts 90. The "*b*" contacts of relay R24 are also closed by its energization and a circuit is completed through a clutch trip magnet 91 when the auto-start contacts 90 are closed by the ejector arm as follows: From line 71, through switch 70, wire 75, relay contacts R24*b*, contact 90, magazine card lever contacts CL1 (now closed) coils of magnet 91 to line 72. The energization of magnet 91 causes latch contacts 89 to transfer to complete a circuit through the motor M. The motor then drives the card feeding mechanism to cause a blank card to be moved from the magazine to the punching station. At the end of this card feeding cycle the contacts 89 are restored to normal position and the circuit to motor M is interrupted. The card at the punching station closes card lever contacts CL2 to establish a circuit through the coil of a relay R26. This relay closes its "*a*" contacts to provide a holding circuit through this relay. This cam contacts C1 are the usual circuit breaker contacts and are closed when a card column is in position to be punched. These contacts permit circuits to be established to the duplicating magnets 92. Contacts C1 are opened as a card moves from one column punching position to another column punching position.

From Fig. 7*b* it is seen that the series of thyratron tubes designated T0–T9 have their cathodes connected to line 72. The control grid of each tube has a substantially fixed voltage applied thereto by battery 73 to maintain each tube in a non-conductive state. The positive side of battery 73 is connected to line 72 and the negative side of this battery extends to the grids of tubes T0–T9 through the grid resistors associated with each tube. These tubes T0–T9 are made conductive to effect the energization of the duplicating magnets 92.

A trio of contact wiper brushes 93 (Fig. 7*a*) are carried by an arm 94 and are electrically connected to one another. The uppermost wiper brush 93 is adapted to contact a common strip of conducting material 95 while the lower two alternately contact insert segments 96, all of which segments and strip comprise an emitter E. The horizontal spacing between segments 96 corresponds to the columnar spacing of the record card in the punching machine and as the card is advanced step by step, the brushes 93 will advance in a similar manner to successively cooperate with the several segments 96 connecting each in turn with the common strip 95.

In order to punch the information stored in the storage device by depression of the 5 key, the 5 magnet 92 must be energized. For example, when the information is to be punched in column 1, the brushes 93 of emitter E are positioned as shown in Fig. 7*a*. The energization of magnet 92 is effected by making the tube T5 conductive as follows: From line 72, common strip 95 of emitter E, brushes 93, first contact segment 96, plug wire 97, wire 98, contacts R10*k* (normal) (Fig. 7*c*), container 12, related electrode 42, contacts R10*f* (normal), wire 99, contact R28*f* (now closed) (Fig. 7*b*), wire 100 to the control grid of thyratron T5. The grid is thus brought to cathode potential and the tube T5 is rendered conductive to energize the 5 magnet 92 through the following circuit: From line 71, through switch 70, wire 75, contacts 89 (normal), contacts R26*a* (now closed), cam contacts C1, coil of 5 magnet 92, wire 101 to the plate of tube T5, cathode of tube T5 to line 72.

Energization of the 5 magnet 92 actuates the 5 punch and associated mechanism, shown in United States Patent 1,962,750 to close contacts 102 which complete a circuit to the coils of punch magnet 103 as follows: From line 71 through switch 70, wire 75, contact 89 (normal), contacts 102 (now closed), coils of punch magnets 103 to line 72. When this magnet is energized, the usual mechanism is actuated to effect punching in the card at the punching station. After the card has been punched, the contacts 102 are open in the manner shown in the above patent to deenergize the punch magnets 103. The same action causes the cam contacts C1 to open to interrupt the circuit through the 5 magnet 92 and associated thyratron T5. In this manner thyratron T5 is quenched. A condenser 104 and resistors 105 and 106 are placed in circuit with the magnet 103 and contacts 102 to limit the arcing across contacts 102 when they are opened.

The card then escapes to the next column to be punched and the emitter arm 94 is moved to the segment 96 of the corresponding column, so that the proper brush 93 can contact the segment. The emitter E closes circuits similar to the ones described above to energize the related magnet 92 according to the information stored in the storage device.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a storage device having data receiving positions, means settable to represent data, a mixture of low conductivity fluid and finely divided metallic particles in each position, a container for the mixture and comprised of electrically conductive material, a plurality of electrodes, one for each datum, extending into the mixture in such a manner that a gap exists between each of said electrodes and the container, means for entering datum in one position of the device, including means effective for drawing particles one against the other to form and hold an electrically conductive path which bridges a gap between a selected electrode and the container, means for entering further datum in another position of said device, including means effective for drawing particles one against the other to form and hold another electrically conductive path which bridges the gap between a second selected electrode and the container, and means for moving said electrodes to erase said data by dispersing in said liquid said particles forming said electrically conductive paths.

2. In a storage device having columns of data receiving positions, the combination of means settable to represent data, a mixture of low conductivity fluid and finely divided metallic particles in each position, a container to confine each mixture and comprised of electrically conductive material, a plurality of electrodes extending into each mixture in such a manner that a gap exists between each of said electrodes and the related container, means for entering datum in one position of the device, including means effective for drawing particles one against the other to form and hold an electrically conductive path which bridges a gap between a selected electrode and the related container, means for advancing said last-named means to another position, means to disable said advancing means to permit said device to remain in the initial position, and means for entering further datum in the same position of said device, including means effective for drawing particles one against the other to form and hold another electrically conductive path which bridges the gap between a second selected electrode and the related container.

3. In a storage device having columns of data receiving positions, a mixture of low conductivity fluid and finely divided metallic particles in each position, a container comprised of electrically conductive material in each position and in which each mixture is confined, an electrode extending into each mixture in such a manner that a gap exists between each electrode and its related container, means for entering said data in columns of the device in succession, including means effective for drawing particles, one against the other, to form and hold an electrically conductive path which bridges said gap, a readout mechanism controlled by the storage device to indicate the data entered column by column in said device, and means for actuating each electrode to agitate the related mixture and disburse the particles forming said conductive path throughout said fluid, whereby the mixture is made ready for a new conductive path.

4. In a storage device, means settable to represent data, a mixture of low conductivity fluid and finely divided metallic particles, a container comprised of electrically conductive material in which said mixture is confined, an electrode extending into said mixture in such a manner that a gap exists between said electrode and container, means for entering said data into said device including means effective for drawing particles one against the other to form and hold an electrically conductive path which bridges said gap, means for supporting said electrode, means for holding said supporting means against movement, means for actuating the holding means to release said supporting means, whereby said electrode is moved through the fluid in one direction, an electrically controlled device, means for activating said device, means under control of said device when activated for moving said element through the fluid in the opposite direction, and resilient means for restoring said electrode to its initial position, thereby disbursing the particles forming said conductive path throughout said fluid to make said mixture ready for a new conductive path.

5. In a storage device, means settable to represent data, a mixture of low conductivity fluid and finely divided metallic particles, a container comprised of electrically conductive material in which said mixture is confined, an electrode extending into said mixture in such a manner that a gap exists between said electrode and container, means for entering said data into said device including means effective for drawing particles one against the other to form and hold an electrically conductive path which bridges said gap, means for supporting said electrode, a latch for holding the supporting means against movement, an electrically controlled device for controlling actuation of said latch, means for activating said device to actuate said latch and release the supporting means, whereby said element is moved through the fluid in one direction, means operable after actuation of said latch to move said electrode through the fluid in the opposite direction, and resilient means for restoring said element to its initial position, thereby disbursing the particles forming said conductive path throughout said fluid to make said mixture ready for a new conductive path.

6. A data storage device including a container comprised of electrically conductive material, a quantity of finely divided conductive particles dispersed in a low conductivity liquid within said container, at least one electrode positioned within said dispersion to define a gap through said dispersion to a conductive surface of said container, means for applying a voltage pulse between said electrode and said surface to establish a path of increased conductivity therebetween by drawing a portion of said conductive particles together to thereby provide an indication of the desired storage of data, and means for moving said electrode to erase said data by re-dispersing in said liquid said particles forming said path of increased conductivity.

7. A decimal digit storage device including a container comprised of electrically conductive material, a quantity of finely divided conductive particles dispersed in a low conductivity liquid within said container, at least ten electrodes positioned within said dispersion, each of said electrodes defining a gap through said dispersion to a conductive surface of said container, means for applying a voltage pulse between a selected one of said electrodes and said surface to establish a path of increased conductivity therebetween by drawing a portion of said conductive particles together to thereby provide an indication of the desired decimal storage value of the digit, and means for moving said electrodes to erase said data by re-dispersing in said liquid said particles forming said path of increased conductivity.

References Cited in the file of this patent

UNITED STATES PATENTS

| | | |
|---|---|---|
| 1,115,174 | Creighton | Oct. 27, 1914 |
| 1,622,298 | Wahl | Mar. 29, 1927 |
| 2,540,654 | Cohen | Feb. 6, 1951 |
| 2,615,692 | Muller | Oct. 28, 1952 |

FOREIGN PATENTS

| | | |
|---|---|---|
| 872,068 | Germany | Mar. 30, 1953 |

OTHER REFERENCES

Publication: Mellon Inst. of Ind. Res., July 11, 1951, Quarterly Report #3, pp. III–1 to III–7, Fig. III–3.